US007044566B1

(12) United States Patent
Penninger et al.

(10) Patent No.: US 7,044,566 B1
(45) Date of Patent: May 16, 2006

(54) CAGING ARRANGEMENT FOR A SPRING

(75) Inventors: William John Penninger, Niles, MI (US); Andrew Paul Wasson, South Bend, IN (US); Thomas David Rothbauer, La Port, IN (US)

(73) Assignee: Robert Bosch GmbH, Stottgart (DE)

( * ) Notice: Subject to any disclaimer, the term of this patent is extended or adjusted under 35 U.S.C. 154(b) by 0 days.

(21) Appl. No.: 10/904,784

(22) Filed: Nov. 29, 2004

(51) Int. Cl.
*B60T 8/44* (2006.01)

(52) U.S. Cl. .................... 303/114.1; 60/547.1; 60/562; 60/589

(58) Field of Classification Search ............. 303/114.1, 303/114.3; 60/562, 589, 592, 545, 547.1, 60/547.2
See application file for complete search history.

(56) References Cited

U.S. PATENT DOCUMENTS

| 5,018,353 | A |   | 5/1991  | Pugh |   |
|---|---|---|---|---|---|
| 5,111,661 | A |   | 5/1992  | Savidan |   |
| 5,207,062 | A |   | 5/1993  | Wilson |   |
| 5,279,125 | A |   | 1/1994  | Keyes |   |
| 5,943,863 | A |   | 8/1999  | Jordan |   |
| 5,988,768 | A | * | 11/1999 | Schaefer et al. | 303/114.1 |
| 6,012,288 | A | * | 1/2000  | Gualdoni et al. | 60/562 |
| 6,386,648 | B1 | * | 5/2002 | Wasson | 303/114.3 |
| 6,402,263 | B1 | * | 6/2002 | Wasson | 303/114.3 |
| 6,606,859 | B1 | * | 8/2003 | Mackiewicz et al. | 60/547.1 |
| 6,775,978 | B1 | * | 8/2004 | Vehe | 60/562 |
| 6,817,179 | B1 | * | 11/2004 | Wasson et al. | 60/562 |
| 6,848,257 | B1 | * | 2/2005 | Bacardit et al. | 60/562 |
| 2003/0030321 | A1 | * | 2/2003 | Kusano et al. | 303/114.1 |

* cited by examiner

*Primary Examiner*—Devon Kramer
(74) *Attorney, Agent, or Firm*—Leo H McCormick, Jr.; Warren Comstock; Sarah Taylor

(57) ABSTRACT

A caging arrangement for setting a spring height and correspondingly chamber size in a master cylinder. A cylindrical member has a convoluted surface that is placed in a bore of a piston and a ball is pressed into the cylindrical member to radially expand the convoluted surface into engagement with the piston. A spring is placed on the piston and a disc placed on the spring. A first end of a valve stem having a radial projection is passed through the disc and a force applied to the valve stem while holding the piston stationary such that the radial projection engages and outwardly moves an inward flange on the cylindrical body to allow the radial projection to move past the inward flange. The force is removed and the spring expands until the radial projection engages the inward flange to set distance between the piston and the valve stem.

8 Claims, 2 Drawing Sheets

CAGING ARRANGEMENT FOR A SPRING

This invention relates to a caging arrangement for a return spring in a master cylinder through which first and second pistons are positioned in a bore to define operational chambers wherein pressurized fluid is developed to effect a brake application.

BACKGROUND OF THE INVENTION

U.S. Pat. Nos. 5,018,353 and 5,111,661 disclose master cylinders wherein compensation between a first chamber in a bore of a housing and a reservoir occurs through a single center port compensation valve associate with a first piston and between a second chamber in the bore through a relationship established between a radial port and sealing structure carried on a second piston. In order to eliminate the possibility of cutting a nub in a seal by extrusion into a radial port, U.S. Pat. Nos. 5,207,062; 5,279,125 and 5,943,863 disclose the use of a second center port compensation valve through which compensation is achieved for the second operational chamber in a bore. In master cylinders having such separate compensation valves for the first and second pressurizing chambers in the bore communication typically occurs through ports from separate passages in the housing when the first and second pistons are in a rest position. In all of such center port compensation valves, the size of the chambers is determined by a height of a caged spring. In addition to the various examples of caging a spring as disclosed in U.S. Pat. No. 5,943,863, U.S. Pat. Nos. 6,775, 978 and 6,817,179 also teach that a linkage member may be screwed into the a valve member or piston to achieve a desired spring height. These various examples of sturcture to cage a spring function in an adequate manner but do involve cost as in most instances special equipment is required or processing is involved such as providing threads on both a stem and the piston and the srewing together to achieve a desired spring heigth. The spring height is important and can be critical in closing communication for a reservoir to a chamber in order for the pressurization of fluid to be initiated after an operator initiates a brake application.

SUMMARY OF THE INVENTION

An advantage this invention is achieved thought the use of a caging arrangement for a master cylinder includes a cylindrical body of a retainer is fixed to a piston by radially expanding a convoluted peripheral surface on the retainer into engagement with the piston.

In more particular details, the master cylinder for use in a brake system has a housing with a first piston and a second piston positioned in a bore therein by caged first and second resilient members to define limits for a first chamber and a second chamber. The first and second chambers are connected to a reservoir through a compensation valves to receive fluid and maintain a desired level of fluid in the brake system and are connected to front and rear wheel brakes to supply pressurized fluid to effect a brake application. The caged first and second resilient members each including a first retainer and a second retainer for holding a spring at a desired height to maintain a distance between the first and second pistons and a face on a head of a stem of a corresponding compensation valve at a desired gap or distance from a seat when the piston is in a position of rest. The head on each stem of a compensation valve is moved into engagement with a seat on initial movement of the piston from the position of rest in response to an input force applied by an operator to terminate communication of fluid from the reservoir to the chamber and with further movement of the piston fluid is pressurized in the chambers to initiate a brake application. The first retainer is characterized by a disc having a flange that surrounds an axial opening while the second retainer is characterized by a cylindrical member having a convoluted peripheral surface adjacent a first end and a plurality of axial slots that extend from a second end toward the first end define fingers with an inward flange on the second end. The first end of the second retainer is located in an axial bore within a piston and retained therein by a ball being pressed into the cylindrical body such that a radial force expands the convoluted peripheral surface into engagement with the piston to fix the second retainer to the piston. A spring is thereafter located between the piston and the first retainer and the head of a stem for the compensation valve brought into engagement with the first retainer while an end with a radial projection is brought into engagement with the inward flange on the fingers. The piston is held stationary and when an initial force is applied to the head of the stem the radial fingers cause the fingers to flex outwardly and allow the radial projection to pass through the inward flange as the spring is compressed. After the radial projection on the stem passes through said inward flange on the second retainer the force on the head is terminated and the spring is allow to expand such that the projection thereon engages the inward flange on the second retainer to set a height for the spring and correspondingly the distance between the head and seat when installed in the bore of the master cylinder.

It is an object of this invention to provide a caging arrangement wherein a cylindrical member is retained in a piston by radially expanding the cylindrical member into the piston by a ball being pressed into the cylindrical member.

DETAILED DESCRIPTION OF THE INVENTION

Figure 1:
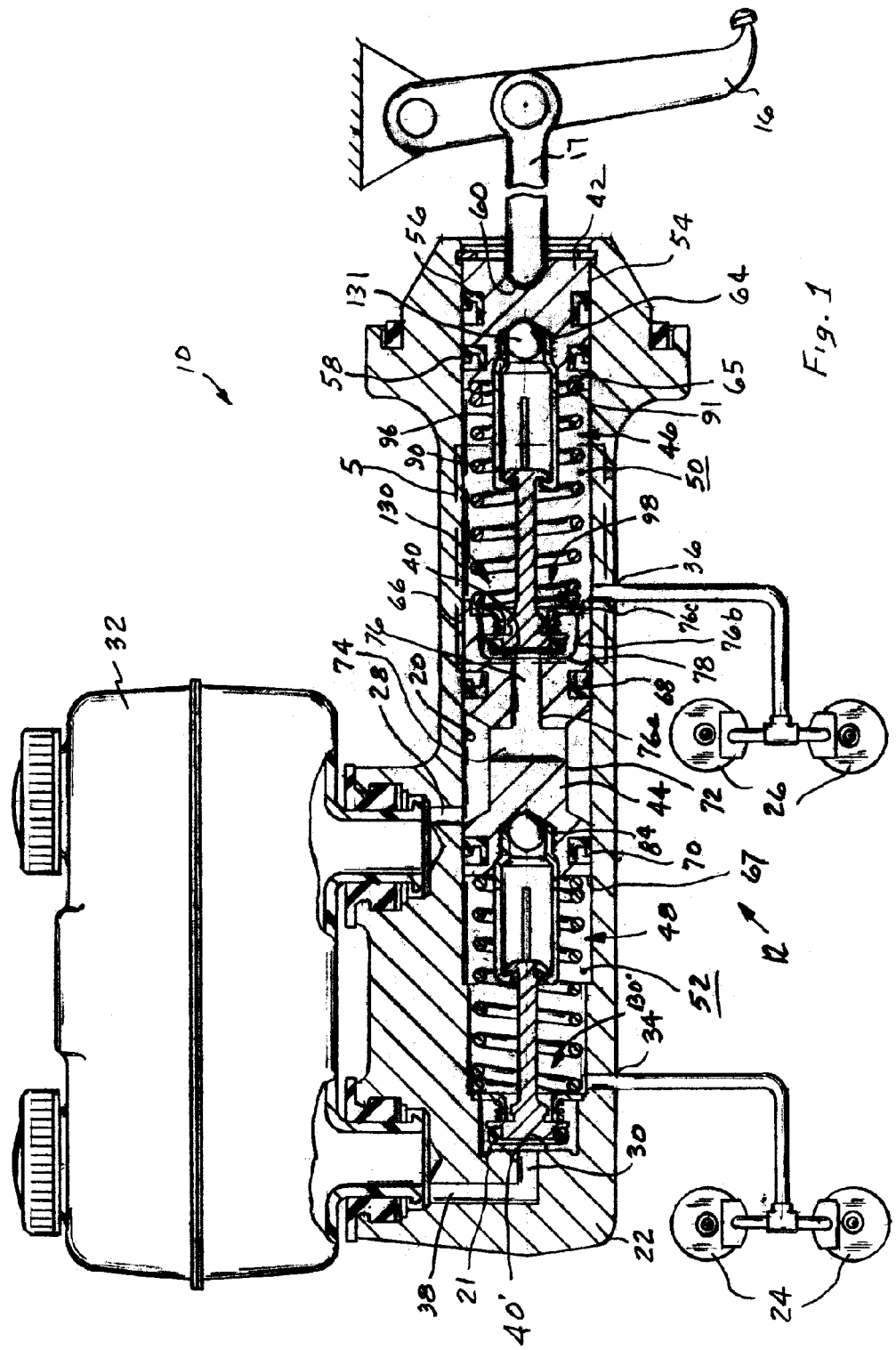
FIG. 1 is a sectional view of a master cylinder wherein first and second pistons are positioned within a bore through by return springs whose height is set by a caging arrangement made according to the present invention.

Throughout this specification and in the drawings certain components that are identical may be identified by the same number with a added thereto.

The brake system 10 illustrated in FIG. 1 includes a master cylinder 12 that is activated in response to an input force applied to a brake pedal 16 to move first 42 and second 44 pistons located in a bore 20 of a housing 22 to provide the front 24 and rear 26 wheel brakes with pressurized fluid to effect a brake application.

In more detail, master cylinder 12 has a housing 22 with a bore 20 therein that is connected by a radial port 28 and axial port 30 to a reservoir 32 and to the front 24 and rear 26 wheel brakes through outlet ports 34 and 36. The first 42 and second 44 pistons are positioned in bore 20 by first 46 and second 48 resilient means to define a first chamber 50 and a second chamber 52.

The first piston 42 has a cylindrical body 54 with grooves therein for retaining first 56 and second 58 seals to seal bore 20 from the surrounding environment, an axial depression 60 for receiving head on push rod 17 from pedal 16 and a smooth axial bore 64 on a front face 65 that has a diameter D-1.

The second piston 44 has a cylindrical member or body 66 having a first end 62 with a groove for receiving seal 68 and a second end 67 with a groove for receiving seal 70 and a compensation groove 72 connected by a passage 74 with an axial passage 76 that extends to the first end. Axial passage 76 has a first diameter 76$a$ separated from a second diameter 76$b$ by a first shoulder 78 and a third diameter 76$c$ adjacent the first end that is separated from the second diameter 76$b$ by a second shoulder 80. The first shoulder 78 is flat and the surface area thereon defines a seat 40 for a compensation valve 130. The second end 67 of the cylindrical body 66 has a smooth axial bore 84 therein with a diameter D-1 that is identical to the smooth axial bore 64 in piston 42.

A first resilient means 46 is located in bore 20 between the first 42 and second 44 pistons to define the limits for a first chamber 50 while a second resilient means 48 is located between the bottom 21 of bore 20 and the second piston 44 to define the limits for the second chamber 52. The length of the first 46 and second 48 resilient means is such that radial port 28 is aligned with compensation groove 72 in piston 44 and as a result passages 74 and 76 are always connected with reservoir 32 while passage 38 is selectively connected to reservoir 32 as a function of the position of compensation valve 130, 130'.

The first 46 and second 48 resilient means are essentially identical in structure and functional operation. Only the first resilient means 46 will be described in detail and where necessary to understand the operation of the invention similar components of the second resilient means 48 will be identified with the same number plus.

Figure 2:
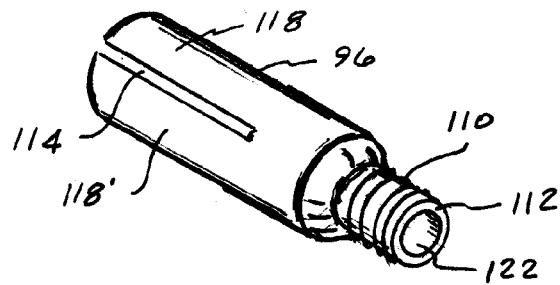
FIG. 2 is an exploded view of the compensation valve of FIG. 1.
Figure 3:
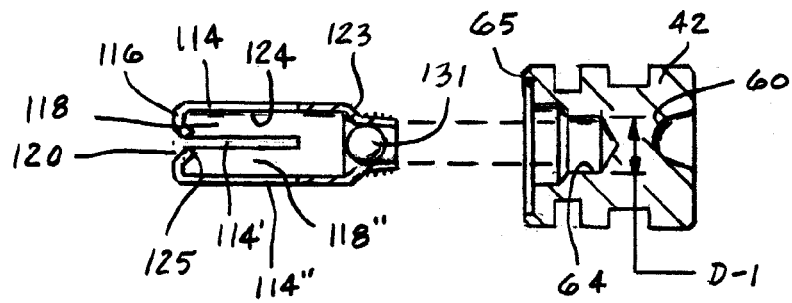
FIG. 3 is a perspective view of a cylindrical retention member of the caging arrangement of FIG. 1.
Figure 4:
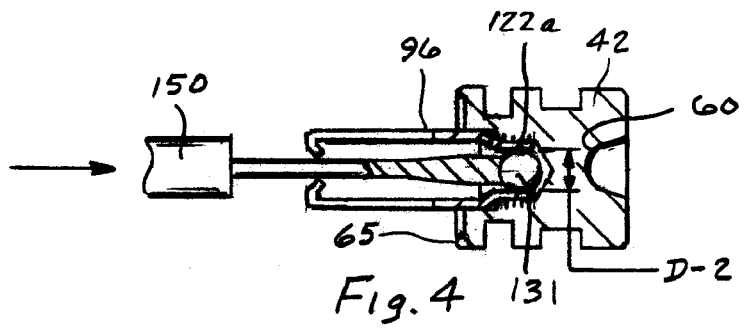
FIG. 4 is a sectional view of the cylindrical retention member of FIG. 2 that is aligned with a first piston of the master cylinder of FIG. 1.

The first resilient means 46 is illustrated in FIG. 1 in bore 20 of the master cylinder 14 and includes a retainer 98, a valve spring 92, a return spring 90 and a cylindrical member retainer 96 that is best illustrated in FIGS. 2, 3 and 4. The return or first spring 90 is caged between retainer 98 and piston 42 by the engagement of a stem 132 on a compensation valve 130 with the cylindrical member 96 to define or set a distance between the piston 42 and the retainer 98 and correspondingly the size of chamber 50.

The retainer 98 is defined by a disc 100 with an axial flange 102 that surrounds an axial opening 104 to provide a guide surface for the second or valve spring 92. The disc 100 has a diameter that corresponds to diameter 76$c$ in piston 44 and is designed to freely engage shoulder 80 in piston 44 or shoulder 80' in bore 20 without binding. The axial flange 102 has a plurality of openings 108, only one is shown, therein that allows for unrestricted flow between axial opening 104 and chamber 50 or chamber 52 when located against shoulders 80 and 80'.

The valve spring 92 is located between retainer 98 and a head 134 on stem 132 that functions as a poppet 146 for the compensation valve 130, 130' to control fluid communication between bore 20 and reservoir 32.

The cylindrical body or member 96 functions as a second retainer, see FIGS. 2, 3, 4 and 5, is defined by an axial bore that has a first diameter 122 that extends from a first end 112 and transitions into a second diameter 124 that extends from a second end 116 by a sloping or tapered surface 123, a peripheral surface with a teeth or convoluted surface 110 adjacent a first end 112 and a plurality of axial slots 114, 114' . . . 114$n$ that extend from a second end 116 toward the first end 112 to define a plurality of resilient fingers 118, 118' . . . 118$n$ with an inward flange 120. The length of the axial slots 114, 114' . . . 114$n$ in the cylindrical body 96 is such that the resilient fingers 118, 118' . . . 118$n$ may flex outward from the cylindrical shape as shown in FIG. 4 to allow ball 131 to be placed in the larger diameter 124 but returns to the axial or cylindrical shape once the ball 131 is located between inward flange 120 and the tapered surface 123. The inward flange 120 is further defined by a lip thereon that slopes toward end 112 in the form of a hook 125 on the second end 116.

As illustrated in FIG. 4, the cylindrical body 96 is aligned with bore 64 in piston 42 and the convoluted surface 110 inserted therein as shown in FIG. 4. The convoluted surface 110 has a diameter D-1$a$ that is smaller than the diameter D-1 of axial bore 64 in piston 42 by an amount the will allow easy insertion and yet provide a snug fit when inserted in bore 80 such that ball 131 acts on and expands diameter 122 to 122$a$ to push teeth or the convoluted surface 110 into the area surrounding axial bore 80 to fix the cylindrical body 96 to piston 42. With the cylindrical body 96 attached to piston 42, return spring 90 is concentrically placed on piston 42 with respect to the cylindrical body 96 and the retainer 98 is placed on the spring 90 with the axial flange 102 facing away from the end of the return spring 90 to receive valve spring 92 for compensation valve 130.

The compensation valve 130 is defined by stem 132 with a head 134 on a first end and an annular radial projection 136 on a second end 142. The head 134 has a groove for receiving an annular poppet 146 while the annular radial projection 136 is slanted toward the first end 140 and functions as a barb 140 such that on engagement is easy in a first direction and hard in the opposite direction. The compensation valve 130 is joined with the cylindrical body 96 by passing the stem 132 through axial opening 104 in disc 100 to bring head 134 into engagement with axial flange 102 and the annular radial projection 136 into engagement with the inward flange 120 on cylindrical body 96. A force is applied to head 134 while piston 42 is held stationary such with further force return spring 90 is compressed as the annular radial projection 136 causes the plurality of resilient fingers 118, 118' . . . 118$n$ to flex outward and allow the annular radial projection 136 to pass through the inward flange 120. After the annular radial projection 136 passes through the inward flange 120, the resilient fingers 118, 118' . . . 118$n$ flex back the cylindrical shape as illustrated in FIG. 3 such that on removal of the force, the return spring 90 provides a spring force between piston 42 and retainer 96 that moves stem 134 away from piston 42 until the annular radial projection 136 engages the inward flange 120 on cylindrical body 94 to define a fixed distance between piston 42 and poppet 146.

Figure 5:
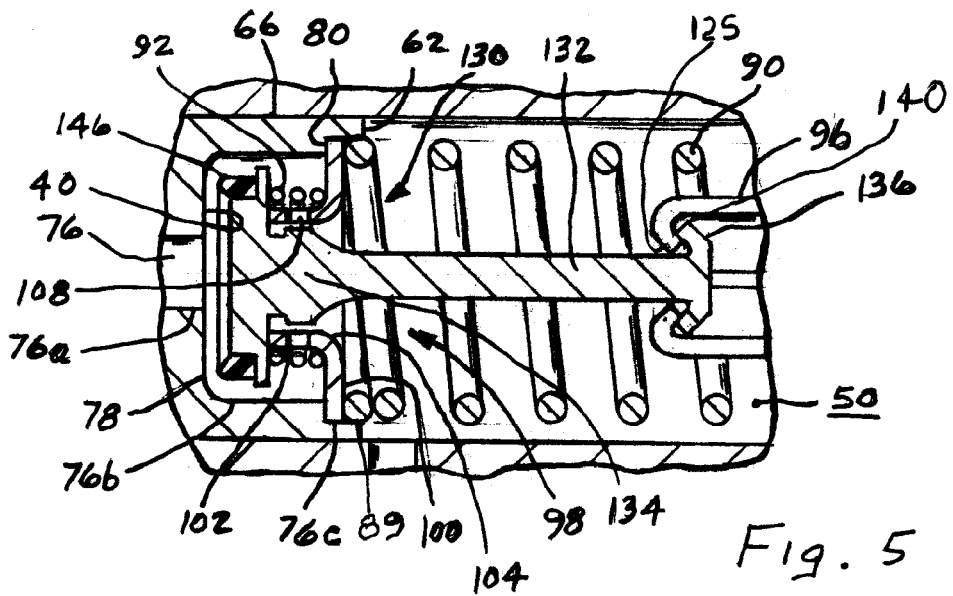
FIG. 5 is a sectional view of the cylindrical retention member of FIG. 3 inserted into a bore of the piston wherein a force has been applied through a fixture to force to a ball into a diameter and radially expand a convoluted surface thereon into engagement with the piston to fix the cylindrical retention member to the piston.

With return spring 90 caged to piston 42 or return spring 90 caged to piston 44 for the master cylinder 10 a desired distance between a poppet 146 on a stem 132 of a compensation valve 130, 130' and the piston 42 or 44 and when positioned in bore 20 to define limits for chambers 50 and 52 of master cylinder 10. The caging of the return spring is identical and is herein after described with respect to piston 42 in the following steps of:

a piston 42 from a source having a cylindrical body with an axial bore 64 located on a front face 65 is obtained from a source;

a retainer 96 having a cylindrical body with a convoluted peripheral surface 110 adjacent a first end 112 and a plurality of axial slots 114, 114' . . . 114n that extend from a second end 116 toward the first end 112 to define a plurality of resilient fingers 118, 118' . . . 118n with an inward flange 120 in the form of a hook 124, the cylindrical body having an axial bore with a first diameter 122 that extends from the first end 112 and is connected to a second larger diameter 124 that extends from the second end 116 with a transitional sloping diameter 123 is obtained from a source;

a ball 131 is obtained from a source and placed in the second diameter 124 of the bore of retainer 94, the ball 131 has a diameter D-2 that is greater than first diameter D-1 of bore and is retained therein by the inward flange 120;

the first end 112 of the retainer 94 is inserting into axial bore 64 of piston 42 such that the convoluted peripheral surface 110 engages the material of the piston 42 surrounding the axial bore 64;

a tool 150, as shown in FIG. 5, is inserted into the cylindrical body 96 and a force is applied to ball 131 while holding piston 42 stationary such that ball 131 moves from the second diameter 124 into the first diameter 122 causing the convoluted peripheral surface 110 to radially expand and frictionally engage the surface 81 on piston 42 to fix the cylindrical body 96 to the piston 42, the frictional engagement is such that a force of more than 500 pounds is required to thereafter separate the cylindrical body 96 from piston 42;

a return spring 90 is obtained from a source and a first end 91 is placed on face 65 of piston 42 such that the return spring 90 is concentric to the cylindrical body 96;

a disc 100 having an axial flange 104 that surrounds an axial opening 102 is obtained from a source and placed a second end 89 of the return spring 90;

a valve spring 92 is obtained from a source and concentrically placed on axial flange 104 of the disc 100;

a shaft 132 for a compensation valve 130 having a head 134 on a first end and annular radial projection 136 in the form of a barb 140 on a second end is obtained from a source;

the shaft 132 is aligned with the axial bore 64 on face 65 of piston 42 and a first force is applied to head 134 to move the second end thereon toward the cylindrical body 96 after passing the axial opening 102 in disc 100 and into engagement with inward flange 120;

a second force is applied to head 134 to compress spring 90 by holding piston 42 stationary such that the annular radial projection 136 passes through the inward flange 120 on the cylindrical body 96 as the plurality of fingers 118, 118' . . . 118n radially flex outward; and thereafter, the second force is terminated and the return spring 90 acts on disc 100 to urge the annular radial projection 136 into engagement with the inward flange 120 such that the barbs 142 meshes with the hooks 125 and thereby define a fixed distance between the piston 42 and the head 134 and correspondingly define a fixed distance that sets the size of a chamber 50 in a bore 20 when the piston 42 is at rest.

MODE OF OPERATION

When an operator desired to effect a brake application, an input force is applied to brake pedal 16 and transmitted through push rod 17 to move piston 42 within bore 20. Initial movement of piston 42 is transmitted through return spring 90 to correspondingly move piston 44 after return spring 90' is compressed such that valve springs 92, 92 for compensations valves 130, 130' move the heads 134, 134' on stems 132, 132' into engagement with seats 40, 40' to terminate communicating from reservoir 32 to chambers 50 and 52. Further movement of piston 42 by the input force thereafter pressurized fluid in chambers 50 and 52 that is communicated to the wheel brakes 24 and 26 to effect a brake application.

On termination of the input force applied to the brake pedal 16, return spring 90, 90' moves pistons 50 and 52 to the position of rest illustrated in FIGS. 1 and 2. In moving the pistons 50 and 52 toward the position of rest, hooks 125 mesh with barbs 142 to form a joint or connection that substantially maintains the resilient fingers 118, 118' . . . 118n in parallel axial alignment without radial deflection that could occur should the such surfaces be in a perpendicular shape.

What is claimed is:

1. A master cylinder for use in a brake system having a housing with a first piston and a second piston positioned in a bore therein by first and second resilient means to define limits for a first chamber and a second chamber, said first and second chambers being connected to a reservoir through a compensation valves to receive fluid and maintain a fluid in said brake system at a desired level and being connected to front and rear wheel brakes to supply pressurized fluid to effect a brake application, said first and second resilient means each including a first retainer and a second retainer for caging a spring to establish a distance between said first and second pistons a face on a head of a stem of a corresponding compensation valve when in a rest position, said head on each compensation valve being moved into engagement with a seat on initial movement of said pistons from said rest position in response to an input force to terminate communication of fluid from said reservoir such that with further movement of said pistons fluid is pressurized in said chambers to initiate a brake application, said first retainer being characterized by a disc having a flange that surrounds an axial opening and wherein said second retainer is characterized by a cylindrical member having a convoluted peripheral surface adjacent a first end and a plurality of axial slots that extend from a second end toward said first end to define a plurality of fingers with an inward flange, said first end of said second retainer being located in an axial bore within a piston and retained therein by a ball exerting a force on said cylindrical member that forces said convoluted peripheral surface into engagement with said piston to fix said second retainer to said piston, said spring being located between said first retainer and said piston such that said head of stem of the compensation valve engages said first retainer and when an initial force is applied to said head of said stem while said piston is held stationary said spring is compressed and a radial projection on said stem after passing through said flange on said first retainer passes through said inward flange on said second retainer and on termination of said initial force the expansion of said spring is limited as said radial projection thereon engages said inward flange on said second retainer to set said distance.

2. The master cylinder as recited in claim 1 wherein each of said first and second resilient means is further characterized by a second spring that is located between said flange on said first retainer and said head, said second spring maintaining the engagement of said face of said compensation valve with said seat during pressurization of fluid in said first and second chambers.

3. The master cylinder as recited in claim 2 wherein said inward flange on said fingers is further characterized by a lip that forms a hook that permits said radial projection on said stem to easily move toward said piston while prevents movement away from said piston.

4. The master cylinder as recited in claim 3 wherein said radial projection on said stem is further characterized by barbs that engage said hook to assist in retaining said stem within said second retainer.

5. The master cylinder as recited in claim 4 wherein said plurality of fingers radially flex outward to allow said barbs to pass through but return to an axial shape after said barb has moved past said inward flange.

6. A method of manufacturing caged resilient means that set a desired distance between a face on a compensation valve stem and a piston to define limits for a chamber in a bore of a master cylinder, said method including the steps of:

obtaining a piston from a source, said piston having a cylindrical body with an axial bore located on a face thereof;

obtaining a retainer from a source, said retainer having a cylindrical body with a convoluted peripheral surface adjacent the first end and a plurality of axial slots that extend from a second end toward said first end to define a plurality of resilient fingers with an inward flange, said cylindrical body having an axial bore with a first diameter that extends from said first end and is connected to a second larger diameter that extends from said second end with a transitional sloping diameter;

placing a ball in the second diameter of said bore of said retainer, said ball having a diameter that is greater than said first diameter of said bore;

inserting said first end of said cylindrical body into said axial bore of said piston such that said convoluted peripheral surface engages the piston;

applying a force to said ball while holding said piston stationary to move the ball from the second diameter and into said first diameter causing said convoluted peripheral surface on said cylindrical body to expand and frictionally engage said piston to fix the retainer to the piston;

obtaining a return spring from a source and placing a first end of the spring on said face of said piston;

obtaining a disc having a flange that surrounds an axial opening from a source and placing the disc on a second end of the return spring;

obtaining a valve spring from a source and placing said valve spring on said disc;

obtaining a shaft having a head on a first end and radial projection on a second end from a source;

aligning said shaft with said axial bore of said piston and applying a first force to move said second end into said retainer after passing said radial projection through said axial opening in said disc to bring said head into contact with said disc;

applying a second force to said head to compress said spring while holding said piston stationary such that said radial projection passes through said inward flange on said cylindrical body of said retainer as said plurality of fingers radially flexing outward; and removing said second force such that said return spring acts on said disc to urge said radial projection into engagement with said inward flange and thereby define a fixed distance between said piston and said head, said fixed distance corresponding defining said limit for the size of the chamber in said bore when the position is in a rest position.

7. The method as recited in claim 6 wherein said inward flange of said cylindrical body of said retainer is further defined by hooks and said radial projection on said stem is further defined by a barb such that barb engages said hooks to prevent radial outward flexing of said fingers.

8. The method as recited in claim 7 wherein said disc is further characterized by an axial flange that surrounds said axial opening, said valve spring being concentrically located on said axial flange to act on and urge said head away from said disc.

* * * * *